United States Patent
Thakore et al.

[11] Patent Number: 6,092,835
[45] Date of Patent: Jul. 25, 2000

[54] AUTOMOTIVE INSTRUMENT PANEL HAVING AN INTEGRAL AIRBAG

[75] Inventors: Ashir Prafull Thakore, Novi; Scott William Hazell, Pinckney; Kenneth Andrew Winowiecki, Waterford, all of Mich.

[73] Assignee: Ford Global Technologies, Inc., Dearborn, Mich.

[21] Appl. No.: 09/138,596

[22] Filed: Aug. 22, 1998

Related U.S. Application Data

[63] Continuation-in-part of application No. 08/784,332, Jan. 16, 1997, Pat. No. 5,810,388.

[51] Int. Cl.$^7$ .................................................... B60R 21/20
[52] U.S. Cl. .......................................... 280/728.3; 280/732
[58] Field of Search ................................ 280/728.3, 732, 280/752, 730.1, 728.1, 728.2

[56] References Cited

U.S. PATENT DOCUMENTS

| | | |
|---|---|---|
| 4,120,516 | 10/1978 | Takamatsu et al. . |
| 4,562,025 | 12/1985 | Gray . |
| 4,610,620 | 9/1986 | Gray . |
| 4,893,833 | 1/1990 | DiSalvo et al. . |
| 4,911,471 | 3/1990 | Hirabayashi . |
| 4,989,896 | 2/1991 | DiSalvo et al. . |
| 4,991,870 | 2/1991 | Beusterien et al. . |
| 5,035,444 | 7/1991 | Carter . |
| 5,072,967 | 12/1991 | Batchelder et al. . |
| 5,080,393 | 1/1992 | Dixon, Jr. et al. . |
| 5,082,310 | 1/1992 | Bauer . |
| 5,131,678 | 7/1992 | Gardner et al. . |
| 5,158,322 | 10/1992 | Sun . |
| 5,180,187 | 1/1993 | Muller et al. . |
| 5,280,947 | 1/1994 | Cooper ................................ 280/728.3 |
| 5,316,335 | 5/1994 | Gray et al. . |
| 5,335,935 | 8/1994 | Proos et al. . |
| 5,372,379 | 12/1994 | Parker . |
| 5,393,088 | 2/1995 | Bauer et al. . |
| 5,403,033 | 4/1995 | Koma . |
| 5,433,474 | 7/1995 | Farrington et al. . |
| 5,447,328 | 9/1995 | Iannazzi et al. . |
| 5,487,558 | 1/1996 | Ball et al. . |
| 5,533,748 | 7/1996 | Wirt et al. . |
| 5,533,749 | 7/1996 | Leonard et al. . |
| 5,845,931 | 12/1998 | Nagy et al. .......................... 280/728.3 |

FOREIGN PATENT DOCUMENTS

| | | | |
|---|---|---|---|
| 405185897A | 7/1993 | Japan | ..................................... 280/752 |
| 405185898A | 7/1993 | Japan | ..................................... 280/752 |

OTHER PUBLICATIONS

Photographs of a 1994 Saab 900, 2 pages.

*Primary Examiner*—Peter C. English
*Attorney, Agent, or Firm*—Damian Porcari

[57] ABSTRACT

An automotive instrument panel having a concealed airbag. A molded substrate having first and second surfaces and an aperture therethrough receives an airbag. A curved metal door is secured to the second surface of the substrate by a plurality of fasteners extending through the substrate. The metal door has a generally U-shaped slot with first and second ends being spaced apart a distance greater than the length of the aperture. The slot is positioned radially outwardly of the aperture. The door also has a plurality of indentations to maintain a curved shape conforming with the surface of the substrate. A molded covering overlies the second surface and the door and is secured thereto with an intermediate layer of foam. A foam gasket overlies the slot between the door and the substrate. A foam impermeable layer is placed between the gasket and door to prevent injected foam from impregnating the foam gasket and interfering with the opening of the door. An airbag chute is secured to the first surface of the substrate by the attaching fasteners. The airbag causes the metal door to fold along the line between the first and second ends of the slots.

1 Claim, 3 Drawing Sheets

AUTOMOTIVE INSTRUMENT PANEL HAVING AN INTEGRAL AIRBAG

This is a Continuation-In-Part (CIP) of U.S. Ser. No. 08/784,332, filed Jan. 16, 1997, U.S. Pat. No. 5,810,388.

BACKGROUND OF THE INVENTION

1. Field of the Invention

The present invention relates to a method of manufacturing an automotive instrument panel having a concealed airbag. More particularly, the present invention relates to a method of manufacturing an instrument panel having a metal door overlying an aperture in a substrate with a molded flexible covering overlying the substrate and metal door.

2. Description of the Related Art

It is known to manufacture an automotive airbag having a seamless covering. One such device is described in U.S. Pat. No. 5,447,328, issued Sep. 5, 1995. The device teaches a hinged metal door secured to a plastic substrate. The hinge is secured to both the plastic substrate and the metal door and folds when the airbag is inflated. A deep groove directly overlying the perimeter of the metal door forms a weakened section in the covering that tears when the door is opened. An airbag door and cover of this construction is difficult to manufacture because a metal hinge must be secured to only one edge of the plastic substrate. It is also difficult to form a deep groove in the covering that directly overlies the perimeter of the metal door. The groove construction taught in the 5,447,328 patent extends almost to the surface of the plastic substrate, making it difficult to inject foam in the vicinity of the groove. It is desirable to inject a foam between the cover and the door to secure the two components without causing the foam to impede the opening of the door.

It is also known that the rapid force needed to deploy an airbag causes stress on the molded plastic substrate when the door is attached to only one edge. Various frames may be attached to the perimeter of the airbag opening to make the substrate more rigid. An example of this construction is illustrated in U.S. Pat. No. 5,393,088 issued Feb. 28, 1995. A metal frame is secured within the aperture of a plastic substrate. A door is attached to one side of the frame with a hinge. The metal frame keeps the substrate from deforming under the impact of an inflating airbag.

Finally, it is also known to secure an airbag to the underside of a substrate using a chute that partially spaces the airbag from the door. Gaps or spaces between the chute and door may allow the airbag to partially inflate behind the panel.

It is an advantage of the present invention to provide a seamless airbag covering having an unhinged door that is secured to a substrate. It is a further object of the present invention to provide an easily manufacturable method of securing the airbag covering to the substrate and door. These and other objects, features and advantages of the present invention will become more apparent to those of ordinary skills in the art upon reference to the attached drawings and following description.

SUMMARY OF THE INVENTION

The present invention relates to a method of manufacturing an automotive instrument panel that conceals an airbag. The steps of manufacturing the instrument panel include providing a molded substrate having first and second surfaces and an aperture therethrough, and a metal door having a generally U-shaped slot secured to the second surface of the substrate with a plurality of attaching posts. The slot has first and second ends being spaced apart a distance greater than the length of the aperture. The slot defines a flap in the door. The flap has a width greater than the width of the aperture. The door and substrate assembly is placed within a mold tool and a pre-molded covering is juxtaposed the substrate. A quantity of foam is injected between the substrate and covering and secures the covering to the substrate.

The present invention also describes an automotive instrument panel having a concealed airbag manufactured by the foregoing method. A molded substrate having first and second surfaces and an aperture therethrough receives an airbag. A curved metal door is secured to the second surface of the substrate by a plurality of fasteners extending through the substrate. The metal door has a generally U-shaped slot with first and second ends being spaced apart a distance greater than the length of the aperture. The slot is positioned radially outwardly of the aperture. The door also has a plurality of indentations to maintain a curved shape conforming with the surface of the substrate. A molded covering overlies the second surface and the door and is secured thereto with an intermediate layer of foam. A foam gasket overlies the slot between the door and the substrate. A foam impermeable layer is placed between the gasket and door to prevent injected foam from impregnating the foam gasket and interfering with the opening of the door. An airbag chute is secured to the first surface of the substrate by the attaching fasteners. The airbag causes the metal door to fold along the line between the first and second ends of the slots.

The invention may be easily manufactured because the foam intermediate the covering and substrate remains generally uniform and may pass over the surface of the door. Further, the invention may be manufactured without a hinge that secures the metal door to the plastic substrate. The absence of the hinge simplifies manufacturing process and prevents foam from seeping through the door in the molding operation.

DETAILED DESCRIPTION OF THE PREFERRED EMBODIMENT

Figure 1:
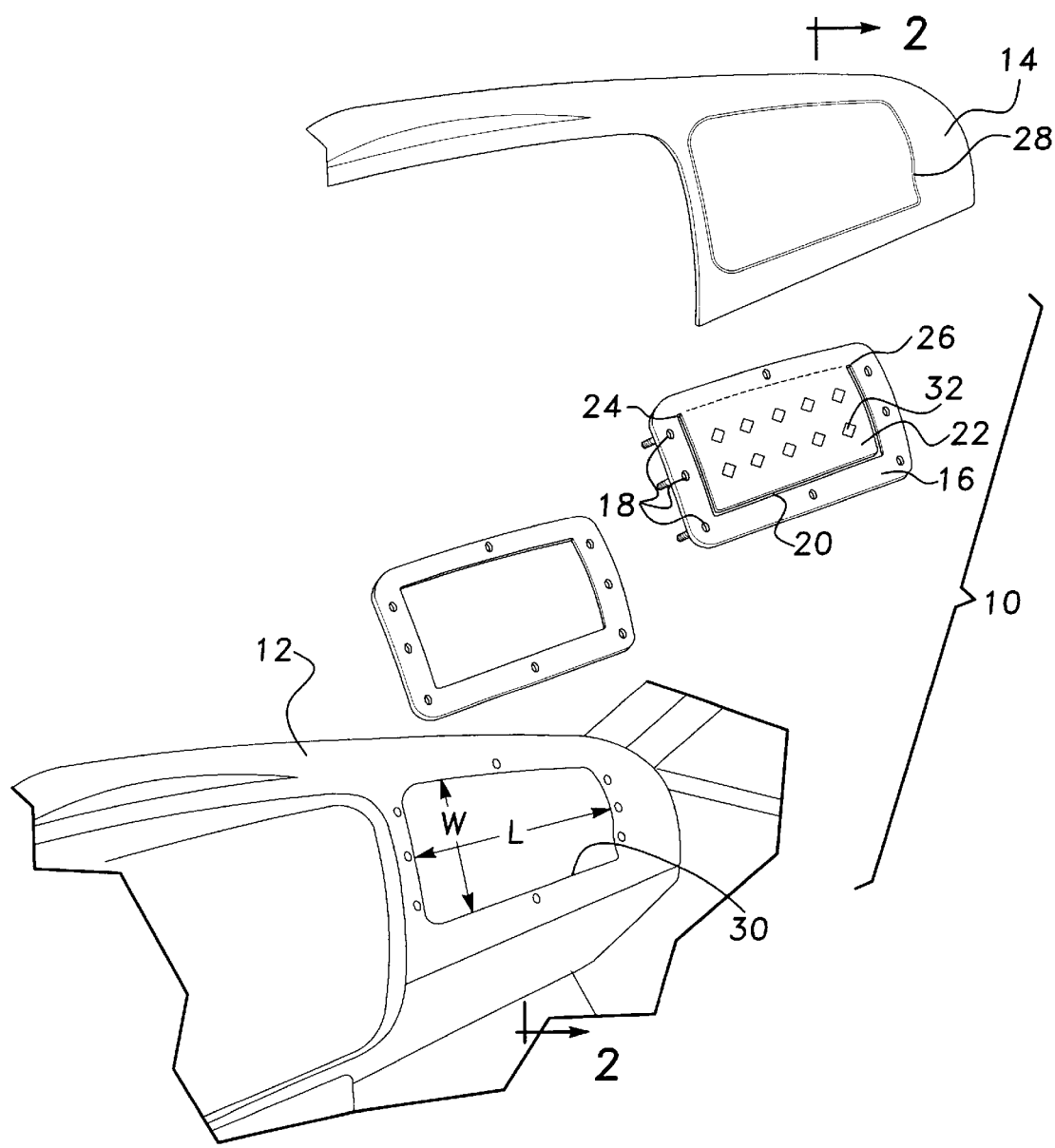
FIG. 1 illustrates an exploded perspective view of a substrate door and molded covering.
Figure 2:
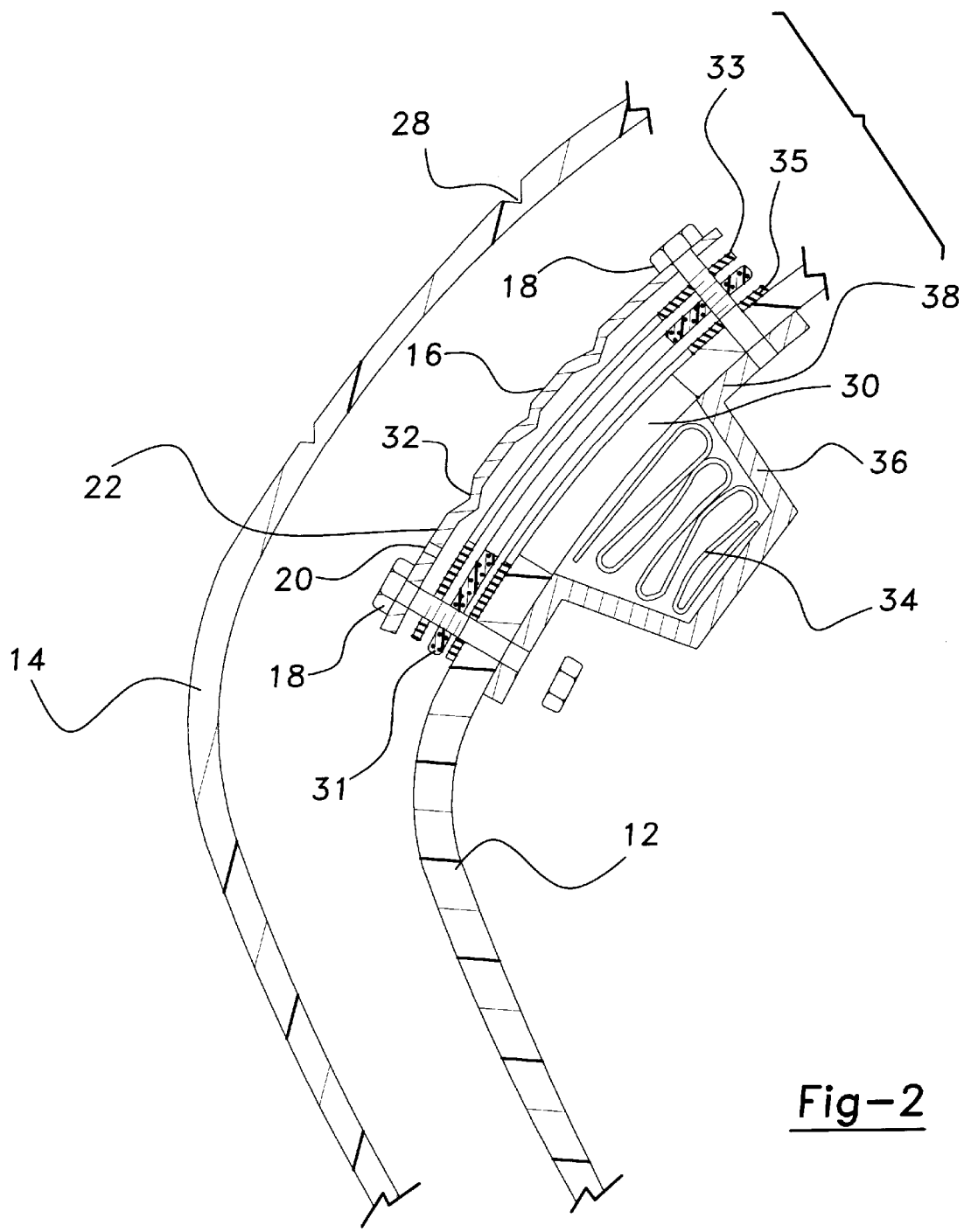
FIG. 2 is an exploded cross-sectional view taken along the line 2—2 in FIG. 1.
Figure 3:
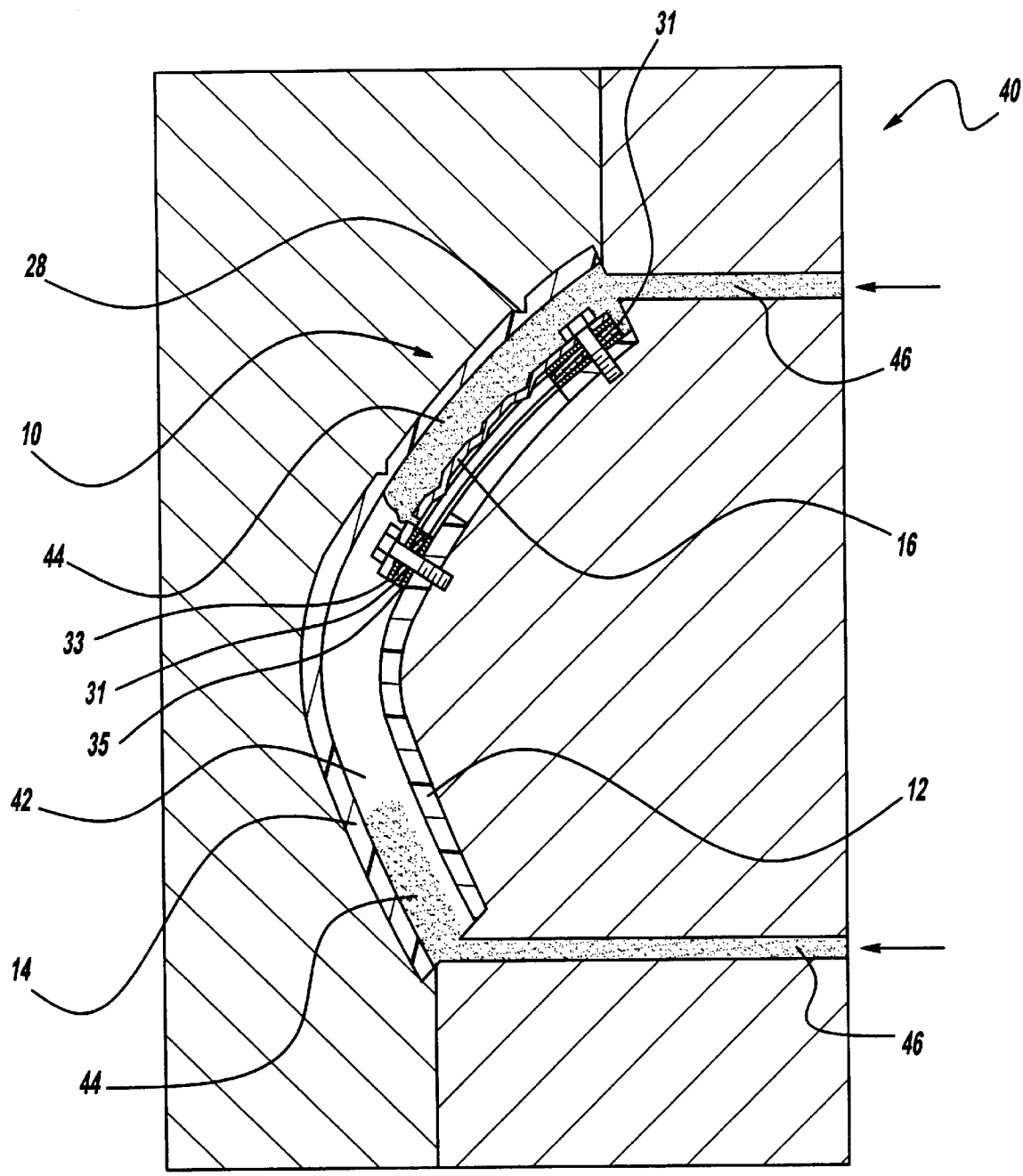
FIG. 3 is a cross-sectional view of the instrument panel undergoing the foaming operation.

The invention as illustrated in FIGS. 1, 2 and 3 teaches a method of manufacturing an instrument panel having a concealed airbag. FIG. 1 is an exploded perspective view of an automotive instrument panel 10 having a plastic molded substrate 12 and a molded flexible covering 14. Substrate 12 is formed in the usual manner of injection molding from materials selected to be durable, lightweight and low-cost. Suitable materials for substrate 12 include polyolefins. Especially preferred is polystyrene or styrene malaeic anhydride (SMA). The covering 14 is pre-molded in the final desired shape for attachment to the substrate 12. Suitable materials for covering 14 include thermoplastic olefins. Especially preferred are thermoplastic urethanes, polyvinyl chlorides (PVC) or PVC-urethane blends. A variety of methods are known for molding the flexible covering including slush molding, thermoform molding, vacuum molding and injection molding. A steel door 16 is attached to a curved surface of the substrate 12 with a plurality of fasteners 18 welded around the perimeter of the door 16. The fasteners 18 extend through the substrate 12 and secure the door 16 to the substrate.

A generally U-shaped slot 20 forms a foldable flap 22 in the door 16. The slot 20 has a first end 24 and a second end 26. The flap 22 generally folds along a line between the first end 24 and the second end 26. The door 16 is manufactured from a relatively soft (low carbon) steel that bends when the force of the airbag is applied against the flap. The flap 22 is generally positioned to open upward towards the windshield when the instrument panel 10 is installed within a vehicle. The covering 14 is formed with an inwardly extending groove 28. The covering 14 is juxtaposed the substrate 12 with the groove 28 positioned radially outwardly of the slot 20. The groove 28 forms an easily fracturable line in the covering 14. The groove 28 lies generally radially outwardly of the slot 20.

The instrument panel shown in FIG. 1 is manufactured in a closed mold foaming operation illustrated in FIG. 3. FIG. 2 is a cross-sectional exploded view of the instrument panel illustrated in FIG. 1 taken along the line 2—2. The substrate 12 has a generally rectangular aperture 30 that forms a passage for an inflating airbag. The aperture 30 has a length label "L" and a width label "W" (illustrated in FIG. 1). The distance between the first and second ends 24, 26, is greater than the length "L". The width of the flap 22, that is the distance between the open and closed ends of the U-shaped slot 20, is greater than the width "W". The flap 22 serves to completely cover aperture 30. This becomes important in the foaming operation described below.

The door 16 is secured to the substrate 12 with a series of fasteners 18. The fasteners 18 generally have a flat head and are welded to the door 16. Between the door 16 and the substrate 12 is a urethane foam gasket 31. The gasket 31 is approximately 1 mm thick and has a cut-out portion in the vicinity of aperture 30. Gasket 31 acts to seal between the door 16 and substrate 12. Any irregularities in either the door 16 or the substrate 12 may cause gaps and allow foam from the foaming operation to seep to the underside of the panel 10. The gasket 31 is compressed between the door 16 and the substrate 12 and fills any voids or openings. Positioned between the door 16 and the gasket 31 is a layer 33 that is impermeable to foam. The layer 33 is generally made from a polymeric material such as urethane, polyester or polyethylene. The layer 33 seals the gasket 31 from foam seepage from the foaming operation that will be described below. Optionally, another layer 35 may be use to seal the gasket 31 from foam seepage between the gasket 31 and the substrate 12. The layers 33, 35 may be separate members positioned adjacent to the gasket 31. Alternatively, the layers 33, 35 maybe thin films or tapes that are bonded to either the gasket 31 or to the door 16 or to the substrate 12. The layers 33, 35 prevent unwanted foam leakage between the door 16 and substrate 12.

An automotive instrument panel generally has a curved shape in the vicinity of the airbag. The substrate 12 is injection molded in the shape of the desired curve. Because the door 16 contains a flap 22, a series of rib-shaped indentations 32 are formed on the flap 22. The indentations assist the flap 22 in retaining the desired curved shape.

The covering 14 is overlaid the substrate 12 and the door 16. The groove 28 is positioned to generally follow the slot 20 but is positioned radially outwardly. The approximate dimensions of the groove are 1.5 mm in width at the top (flush with the surface of the covering), 1.5 mm deep (measured from the surface of the covering to the bottom of the groove) and 1.0 mm across (at the bottom of the groove). The top edges of the groove are generally curved with a radii of 0.75 mm.

An airbag 34 is positioned to the under surface of the substrate 12. The fasteners 18 secure the airbag chute 36 to the instrument panel 10. The airbag 34 is of a conventional nature having a rapidly expanding gas that inflates a fabric bag. The airbag deflecting chute 36 directs the airbag 34 to pass through the aperture 30. A shoulder portion 38 of the chute 36 generally seals the perimeter of aperture 30. The inflating airbag 34 is not exposed to any sharp or jagged surfaces of aperture 30. This also reduces the possibility that the airbag is inflated on the under surface of the substrate 12.

The covering 14 is secured to the substrate 12 and the door 16 in a foaming operation illustrated in FIG. 3. A mold tool 40 moveable between open and closed positions receives substrate 12 with door 16 attached thereto. The covering 14 is secured to another surface of the tool 40 by a vacuum. The covering 14 is juxtaposed the substrate 12 and is spaced a fixed distance apart. The distance between the covering 14 and the substrate 12 forms a space for receiving a foam 44. Suitable foam materials include polymer foams. Especially useful are polyurethane foams. Polyurethane foams demonstrate good adhesion to each of the substrate, covering and door. The foam 44 is injected into the space 42 through passages 46. The foam has a nominal thickness of approximately 6–10 mm. The foam 44 secures the covering 14 to the substrate 12 and the door 16. To aid in securing the foam 44 to the door 16, the door is electro-coated (E-coated) cold rolled steel. The E-coat prevents rust and also promotes adhesion of the foam. Space 42 generally overlies the door 16 and is generally uniform along the substrate 12 and the door 16. The foam 44 is allowed to freely move along the surface of the substrate 12 and the door 16 even in the vicinity of the slot 20. The foam 44 contacts the layer 33 and is prevented from impregnating the gasket 31. In the absence of the layer 33, the foam 44 may pass through the slot 20 and impregnate the foam gasket 31. This may cause the foam 44 to adhere to the flap 22 and impede its ability to open freely. The layer 33 and optionally the layer 35 serve to prevent foam 44 from impregnating the gasket 31 or entering the space between the airbag 34 and the flap 22.

After the foam is allowed to cure, the completed instrument panel 10 is removed from the tool 40. The airbag 34 and chute 36 are secured to the under surface of the substrate 12 by means of the attaching fasteners 18. The instrument panel 10 is installed within a vehicle (not shown). In the event of a collision, the airbag 34 inflates causing the rapidly expanding bag to push the flap 22 outwardly. The flap 22 causes the covering 14 to sever in the vicinity of the groove 28. The invention has been described as a method of manufacturing an automotive instrument panel using the drawings and description provided. Various adaptations or modifications to the instrument panel may be made without departing from the spirit and scope of the following claims.

What is claimed:

1. An automotive instrument panel having a concealed airbag comprising:

a molded substrate having first and second surfaces and an aperture allowing inflation of an airbag therethrough;

a metal door having a peripheral portion secured to the second substrate surface by a plurality of fasteners extending through said substrate, said metal door having a generally U-shaped slot with first and second ends spaced apart a distance greater than a length of said aperture, said slot being positioned radially outwardly of said aperture, said slot defining a foldable flap;

a foam gasket overlying said U-shaped slot intermediate said door and said substrate;

a foam impermeable layer intermediate said gasket and said door;

a molded covering overlying said second surface and said door;

a foam adhering said covering to said second substrate surface, said impermeable layer preventing said foam from impregnating the foam gasket and interfering with the opening of the door;

an airbag chute secured to said fasteners; and the airbag being within said chute, said airbag folding said door along a line between said first and second ends when inflated.

* * * * *